United States Patent
Greenwald (10) Patent No.: US 11,720,950 B2
(45) Date of Patent: *Aug. 8, 2023

(54) INTUITIVE ENTITY NAVIGATION

(71) Applicant: Etsy, Inc., Brooklyn, NY (US)

(72) Inventor: Daniel Meron Greenwald, San Francisco, CA (US)

(73) Assignee: Etsy, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,583

(22) Filed: May 18, 2022

(65) Prior Publication Data

US 2022/0277378 A1 Sep. 1, 2022

Related U.S. Application Data

(63) Continuation of application No. 16/284,874, filed on Feb. 25, 2019, now Pat. No. 11,361,365.

(51) Int. Cl.
*G06Q 30/00* (2023.01)
*G06Q 30/0601* (2023.01)
*G06F 16/248* (2019.01)
*G06F 16/2457* (2019.01)

(52) U.S. Cl.
CPC ....... *G06Q 30/0631* (2013.01); *G06F 16/248* (2019.01); *G06F 16/24575* (2019.01); *G06Q 30/0623* (2013.01)

(58) Field of Classification Search
CPC .............. G06Q 30/0641; G06Q 30/02; G06Q 30/0277; G06Q 30/0601; G06Q 30/0603; G06Q 30/0613; G06Q 30/0643; G06Q 30/08; G06Q 30/0631; G06Q 30/0623; G06F 16/248; G06F 16/24575
See application file for complete search history.

(56) References Cited

U.S. PATENT DOCUMENTS

| | | | |
|---|---|---|---|
| 10,037,360 B2 | 7/2018 | Venkataraman | |
| 10,133,729 B2* | 11/2018 | He | G06F 16/3329 |
| 10,339,586 B1* | 7/2019 | Khobragade | G06Q 30/0631 |
| 10,467,261 B1 | 11/2019 | Doyle | |
| 10,474,756 B2* | 11/2019 | Anisimovich | G06N 3/045 |

(Continued)

OTHER PUBLICATIONS

An Attention-Based Recommender System to Predict Contextual Intent Based on Choice Histories across and within Sessions, by Ruo Huang, Shelby McIntyre, Meina Song, Haihong E, and Zhonghong Ou, Applied Sciences, 8, 2426, 2018 (Year: 2018).*

(Continued)

*Primary Examiner* — Anne M Georgalas
(74) *Attorney, Agent, or Firm* — Fish & Richardson P.C.

(57) ABSTRACT

This specification relates to methods and systems for providing intuitive navigation of a set of entities. One of the methods includes determining n-dimensional embeddings representing entities; reducing the n-dimensional embeddings representing entities into a 2-dimensional representation of the entities; forwarding, for display on a user's computing device, the 2-dimensional representation of the entities; receiving an input from the user's computing device; responsive to the input, determining an additional 2-dimensional entity representation; and forwarding, for display on the user's computing device, the additional 2-dimensional entity representation.

20 Claims, 10 Drawing Sheets

(56) References Cited

U.S. PATENT DOCUMENTS

| | | | |
|---|---|---|---|
| 10,515,400 B2 | 12/2019 | Krishnamurthy | |
| 10,579,688 B2 | 3/2020 | Green | |
| 10,789,530 B2 | 9/2020 | Bruss | |
| 11,004,135 B1* | 5/2021 | Sandler | G06Q 30/0631 |
| 11,361,242 B2* | 6/2022 | Green | G06N 20/00 |
| 11,361,365 B2 | 6/2022 | Greenwald | |
| 11,373,228 B2* | 6/2022 | Soohoo | G06F 16/285 |
| 11,373,231 B2* | 6/2022 | Soohoo | G06V 10/84 |
| 11,514,330 B2* | 11/2022 | Ma | G06N 3/047 |
| 2004/0059626 A1 | 3/2004 | Smallwood | |
| 2012/0159620 A1* | 6/2012 | Seifert | H04L 63/1416 726/22 |
| 2012/0290621 A1 | 11/2012 | Heitz | |
| 2015/0089399 A1* | 3/2015 | Megill | H04L 12/1813 715/753 |
| 2016/0328776 A1 | 11/2016 | Amacker | |
| 2017/0221119 A1 | 8/2017 | Pellow | |
| 2018/0218063 A1* | 8/2018 | Nag | H04L 67/02 |
| 2018/0240013 A1* | 8/2018 | Strope | G06N 3/045 |
| 2018/0349501 A1 | 12/2018 | Ramanath | |
| 2019/0087426 A1* | 3/2019 | Kapoor | G06F 40/30 |
| 2020/0133967 A1 | 4/2020 | Shukla | |
| 2020/0167690 A1 | 5/2020 | Zhao | |
| 2020/0226460 A1* | 7/2020 | Bruss | G06F 16/254 |
| 2020/0273081 A1 | 8/2020 | Greenwald | |

OTHER PUBLICATIONS

"Improving Recommendations by Embedding Multi-Entity Relationships with Latent Dual-Metric Learning," by Yuanbo Xu, Yonghan Yang, Jiayu Han, Xiang Li, and En Wang, IEEE Access, vol. 7, 9817-9826, Jan. 29, 2019.

Krishnamurthy et al., "Leaning Vector-Space Representations of Items for Recommendations using Word Embedding Models," Procedia Computer Science, 2016, 80:2205-2210.

Ngan et al., "Image-driven Navigation of Analytical BRDF Models," Rendering Techniques, Jun. 26, 2006, pp. 399-407.

Rubner et al., "Adaptive Color Image Embeddings for Database Navigation," Asian Conference on Computer Vision, Springer, Berlin, Heidelberg, Jan. 8, 1998 pp. 104-111.

* cited by examiner

INTUITIVE ENTITY NAVIGATION

BACKGROUND

Related Applications

This application claims priority to U.S. Application Ser. No. 16/284,874, filed Feb. 25, 2019, the entire contents of which are hereby incorporated by reference.

Technical Field

This specification relates to methods and systems for allowing a user, e.g., a buyer, to navigate through a set of entities, e.g., product listings, shop pages, or collections of items selected by users, including potentially combinations of different types of entities.

BACKGROUND

Many online resources provide a user interface that supports searches for information, such as items for sale at an electronic commerce (i.e., an e-commerce) website. To begin a search, a user typically provides one or more search terms, terms that are descriptive of the information sought, to a search engine that is part of the online resource. The search engine processes the search query to identify relevant results from a collection of information, and returns the results to the user. The results are typically automatically generated by analyzing the search query and/or other contextually relevant data against information in the collection (including supplementary data or meta-data). Being automated, the quality of the results returned by the search engine is largely dependent upon the content of the search query, the specificity of the information in the collection, and the ability of the search algorithms to locate and identify information relevant to the query. In some cases, the initial search results may not be accurate, relevant, or satisfactory to the user.

SUMMARY

This specification describes technologies that allow users to navigate through a set of entities, e.g., product listings, shop pages, or collections of items selected by users, including potentially combinations of different types of entities. Certain embodiments of a navigation based system can be used independently of other search methods (e.g., grid-like listings, query-based search, swipe-right-or-left) or can be augmented by, and/or used in conjunction with, these methods. This intuitive navigation method allows users to navigate large sets of entities in a way that is based at least in part on intuitive similarities between different types of entities, rather than based solely on their explicit attributes.

In certain embodiments, users can scroll through a set of entities that are arranged on the screen, e.g., as a set of cards can be arranged on a table (or other 2 dimensional surface), with intuitively similar entities closer to one another, forming a map of entities. Interacting with the information displayed (e.g., clicking and dragging the screen, or clicking on individual items to bring them to the center of the screen) further refines the set of entities that are displayed. Because similar entities/items are close to one another, a user is able to traverse the space in a wholly intuitive way to browse for exactly the type of entity the user is seeking. The user interface can receive input to indicate a user's desire to focus (e.g., "zoom in", examples of which are used without loss of generality further in this application) on an area or entity displayed on the map of entities to allow the user to see more detailed variations of entities, e.g., different types of victorian wooden chairs). Similarly, the user interface can receive input indicating a user's desire to de-focus (e.g., "zoom out", examples of which are used without loss of generality further in this application) from a certain portion of the map of entities. In response to such an indication to zoom out from a certain area of the map, the user interface allows a user to see more thematic categories an/or representative entities, e.g., chairs vs. sofas vs. tables.

To accomplish such an intuitive navigation system, a machine learning system can be trained to develop embeddings of entities in a multi-dimensional latent space, e.g., with an autoencoder trained on listing reproduction error or based on co-click or co-purchase similarities between listings. In certain embodiments, this embedding space and the objects within it are then projected into a lower dimensional (e.g., 2-dimensional) coordinate system (methods to accomplish this projection can include: PCA, t-SNE, dynamic force-modeled graphs, hyperbolic spaces projected to a Poincaré disk and/or projection into an interactive rendering of a 3D space either for flat screens, virtual reality, or similarly intended displays). This dimensionality reduction can be accomplished either without duplication (in which case each entity listing can have a unique location in a 2D manifold) or with replacement (in which case entities might appear in multiple places in the manifold). As an example of the case where entities might appear in multiple places in the manifold, a '50s retro lime green chair might appear next to other chairs in one area of the manifold and next to other '50s home decor in another area.

In certain embodiments, a web-or-app-based navigational interface, using intuitive controls (e.g., touch), lets the user manipulate the display, e.g., focus on individual items, scroll around, rotate perspective and/or orientation, and zoom in and out. In certain embodiments, a user may provide a representation of a three (or more) dimensional object or image onto which the mapping is projected. The representation can undergo image recognition, geolocation, or probabilistic heuristics analysis to determine known or inferred attributes of the user-submitted representation. These attributes can be applied to both the calculation of the embeddings and/or the projection of those embeddings.

In certain embodiments, the calculation of the embeddings of entities and/or the projection of those embeddings of entities into a lower-dimensional space for forwarding to a user's display may be influenced and/or modified (e.g., by changing the objective function, by incorporation of manual or heuristic rules, by modifying parameters or hyperparameters, and/or by repetition or omission of the representations of particular entities or classes of entities within the embedding layer or the lower-dimensional space) in order to improve the performance of business key performance indicators (KPIs). Such embodiments may for example repeat representation of items within the embedding space which have a high value, are sponsored, and/or have a high click-through or conversion rate, in order to maximize metrics such as the sale of certain products, revenue, sales volume, and/or direct value to the customer.

In general, one innovative aspect of the subject matter described in this specification can be embodied in methods that include the actions of: determining n-dimensional embeddings representing entities; reducing the n-dimensional embeddings representing entities into a lower dimension (e.g., 2-dimensional) representation of the entities; forwarding, for display on a user's computing device, the lower dimensional representation of the entities; receiving an input from the user's computing device; responsive to the input, determining an additional lower dimensional entity representation; and forwarding, for display on the user's computing device, the additional lower dimensional entity representation.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method can further include receiving a search query from a user's computing device and determining a set of entities in response to the search query. The method can further include converting the search query into a vector representation of the search query and determining n-dimensional embeddings representing entities can include determining embeddings within a specified proximity to the vector representation of the search query.

The method can further include determining proximity between embeddings. The proximity between embeddings can be based at least in part on a distance metric. The distance metric can include at least one of cosine similarity, Euclidean distance, Poincaré distance and geodesic distance for a discrete graph. The entities can be products (product listings) and receiving an input from the user can include receiving an indication of a user's desire to see more products that are similar to at least one displayed product. Similarly, receiving an input from the user can include receiving an indication of a user's desire to see more products that are less similar to or more diverse from each other than the products that are currently being displayed. More generally, the entities can be at least one of product listings, shop pages, item categories, and collections of items selected by users. Forwarding, for display on a user's computing device, a lower dimensional representation of the entities can include forwarding, for display on a user's computing device, a high-level view of the lower dimensional representation of the entities and receiving an input from the user's computing device can include receiving an input from the user's computing device to provide more detailed information from a portion of the high-level view.

The subject matter described in this specification can be implemented in particular embodiments so as to realize one or more of the following advantages. As noted above, because similar items are organized to be close to one another (e.g., by using embeddings as described above), a user is able to traverse the space in a wholly intuitive way to browse for an entity the user is interested in without requiring the user to express an explicit search criteria. If a user is interested in one of the entities displayed, the user can simply focus in, e.g., zoom in, on that entity to see more entities like the one of interest. If the user is not interested in what is displayed the user can de-focus, e.g., zoom out, to see more options or translate through the manifold (e.g., "pan", examples of which are used without loss of generality further in this document) in a direction that seems interesting to the user. Because the user interface is intuitive, all varieties of users (e.g., independent of language fluency or literacy) can utilize the user interface to find entities, e.g., products, of interest, efficiently and easily.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
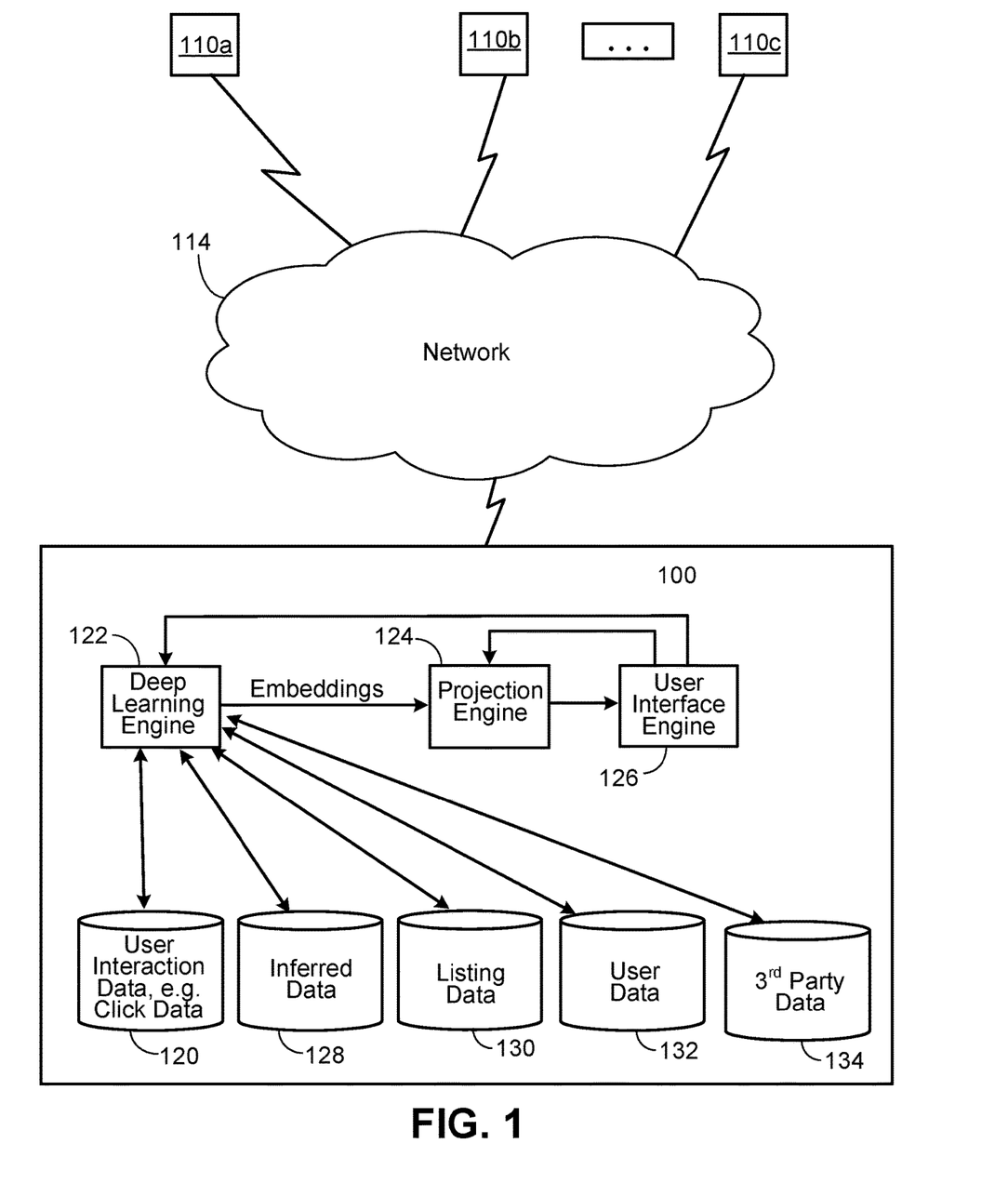
FIG. 1 illustrates an example system for providing intuitive navigation.

This specification describes technologies allowing users to navigate intuitively through a set of entities, e.g., product listings, shop pages, or a collection of items selected by users. These technologies can assist with browsing through categories, use cases/actions, procedures, locations (e.g., in the context of vacation rentals), or combinations of entities (e.g., shops & listings). FIG. 1 shows an example intuitive navigation system 100. The illustrated system interacts with a variety of user computing devices, e.g., devices 110a, 110b, 110c via network 114. The system 100 includes a machine learning engine 122 (e.g., a deep learning engine) which can be in communication with a variety of data sources including one or more of user interaction data 120, inferred data 128, entity data 130 (e.g. listing data), data about users 132 (e.g., user data other than user interaction data or inferred data) and 3rd party data 134; such data may include but is not limited to product listing text, images, reviews (e.g., star ratings), shop owner data, click rates, purchases, cart adds, favoriting, and views. The machine learning engine 122 can determine n-dimensional embeddings associated with entities of interest and forward the n-dimensional embeddings to a projection engine 124.

An embedding assigned to an entity is a coordinate point within a manifold (a "latent space" or "embedding space") that has certain desirable characteristics, e.g., a lower dimensionality and/or learning method and/or regularization regime designed to distill information, e.g., qualitative or quantitative information, about the entity into a numerical format suitable for additional machine processing, e.g. calculating similarity between entities by way of measuring the distance metric between their corresponding embeddings. Embeddings are often designed to make it easier to do machine learning on large inputs like sparse vectors, e.g., sparse vectors representing words or images or user interaction data (e.g., views, purchases). In some embodiments, an embedding captures some of the semantics of the input by placing semantically similar inputs close together in the embedding space. An embedding can be learned and reused by multiple models. Different types of entities may be mapped to embeddings within the same manifold.

The machine learning engine 122 calculates embeddings for entities in order to facilitate further processing by the projection 124 and other downstream modules. Several methods, including both models and ensembles of models, are suitable for generating these embeddings, which are an intermediate output of the system. Such methods include skip-gram like models, autoencoder-generated embeddings, embeddings produced by generative adversarial systems, directed probabilistic graphs/belief networks, and/or similarly intended machine learning techniques. The particular choice of method for producing the embeddings depends on the context in which the system is deployed; for example, variational autoencoders (VAEs) or generative adversarial networks (GANs) can be used to generate image embeddings, and recurrent neural network (RNN) systems can be used to generate text embeddings. Embeddings may be the product of two or more different machine learning systems, as in cases where a hierarchical approach is used to generate query embeddings by first translating the individual components (tokens, e.g. words or characters) in the query into one embedding space, and then generating a query-level embedding by translating the tensor of concatenated token embeddings into a query-level embedding for further manipulation. The dimensionality of the embeddings is a hyperparameter that can be tuned during engineering of the system to maximize performance, rather than set as an a priori characteristic of the method described herein. Embeddings are refined iteratively by a machine learning methodology according to the input data specified by the nature of the embeddings, and the objective function specified by the method of producing these embeddings. Such a system may pre-compute embeddings for use in a low-latency downstream computational pipeline. Such a system may generate embeddings in real-time, e.g. by streaming data and performing in-session calculations. Alternatively, such a system may use a combination of pre-compute and real-time approaches.

In certain embodiments, the calculation of the embeddings of entities and/or the projection of those embeddings of entities into a lower-dimensional space for forwarding to a user's display may be influenced and/or modified (e.g., by changing the objective function, by incorporation of manual or heuristic rules, by modifying parameters or hyperparameters, and/or by repetition or omission of the representations of particular entities or classes of entities within the embedding layer or the lower-dimensional space) in order to improve the performance of business key performance indicators (KPIs). Such embodiments may for example repeat representation of items within the embedding space which have a high value, are sponsored, and/or have a high click-through or conversion rate, in order to maximize metrics such as the sale of certain products, revenue, sales volume, and/or direct value to the customer.

The projection engine 124 makes use of these intermediate entity embeddings by projecting the n-dimensional embeddings onto a lower dimension, e.g., onto a 2-dimensional space, resulting in projection data. In certain embodiments, a user may provide a representation of a three (or more) dimensional object or image onto which the projection is determined and overlaid upon the user-provided representation. The projection can be performed so as to maintain (or improve, e.g., maximize) certain desired criteria. For example, one criterion can be to ensure that entities that are close together in the n-dimensional embedding space are also close together on the lower-dimensional (e.g., 2-dimensional) space. Another criterion can be to ensure that entities that are at least a certain distance apart in the n-dimensional embedding space are also at least a specified distance apart in the lower dimensional (e.g., 2-dimensional) space. As noted above, this dimensionality reduction can be accomplished either without duplication (in which case each entity listing has a unique location in the 2D manifold) or with replacement (in which case entities might appear in multiple places in the manifold). As an example of the case where entities might appear in multiple places in the manifold, a '50s retro lime green chair might appear next to other chairs in one area and next to other '50s home decor in another area. Methods to accomplish this can include —PCA, t-SNE, dynamic force-modeled graphs, hyperbolic spaces projected to a Poincaré disk, projection into an interactive rendering of a 3D space either for flat screens, virtual reality, or similarly intended displays. A user-submitted representation can undergo image recognition, geo-location, or probabilistic heuristics analysis to determine known or inferred attributes of the user-submitted representation. These attributes may be applied to both the calculation of the embeddings and/or the projection of those embeddings.

The projection engine 124 forwards the projection data to a user interface engine 126 which can further process the projection data and forward it to a user device for display to a user. The user interface engine can capture user reaction to what is displayed to the user, e.g., signals such as user navigation signals. The user interface engine 126 can provide such user feedback data to the projection engine 124 and/or the machine learning engine 122. The system can then modify the machine learning model and/or the projection process based on the user feedback data.

Such a user interface may allow, alone or in combination a variety of interactions such as: typed commands; gestures input by mouse, touchpad, trackball, and/or similar peripherals; touchscreen feedback; feedback from haptic devices; and feedback inferred by motion tracking. The technologies described in this specification allow the locations of the entities within the lower-dimensional projection to reflect an intuitive navigation for a collection of items/entities. User feedback allows the user to translate intuitively across, or manipulate their perspective within, the space. The projection of the entities responds adaptively to the coordinates and/or orientation of the user's GUI within this lower-dimensional space. The system equates navigational concepts such as the direction of motion with corresponding changes in the GUI. For example, the navigational GUI has a limited scope (e.g., screen size) and a limited resolution (e.g., screen resolution). By "traversing" the lower-dimensional space as one would traverse a map, different parts of the lower-dimensional projection are brought into view; and by zooming in or zooming out as one would do with an interactive map, different entities within the lower-dimensional projection are correspondingly shown or hidden in order to accommodate the resolution of the device and the visual appeal to the user.

Figure 2A:
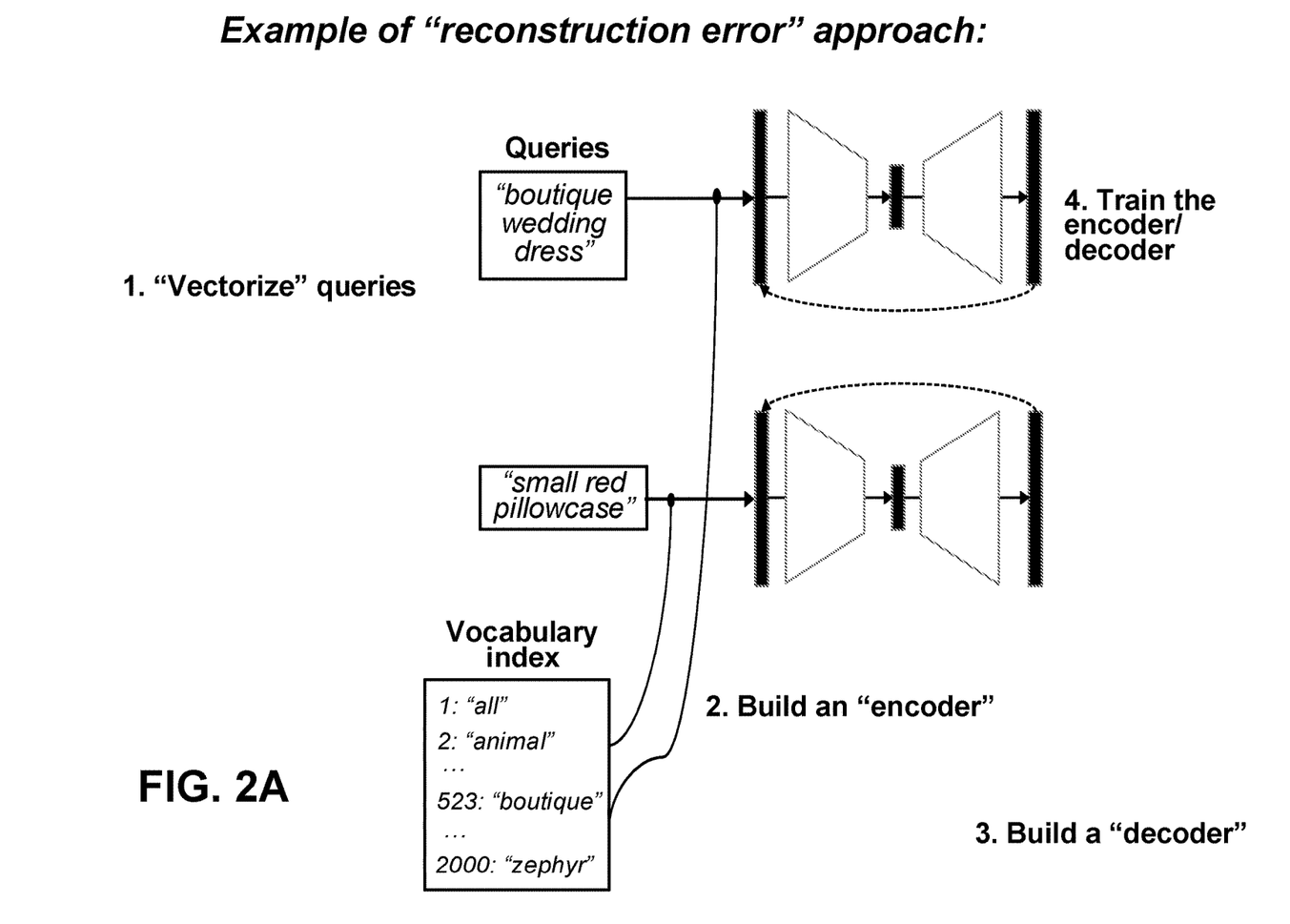
FIG. 2A is an example of a reconstruction error approach that can be used in the system of FIG. 1.

As an example of how embeddings can be calculated, FIG. 2A illustrates a reconstruction error approach applied to queries. In step 1, the approach vectorizes listing (e.g. product) descriptions by matching the description text against an index (e.g., if one has a 20,000 word vocabulary, then every description turns into a sparse 20,000 dimensional vector where each dimension corresponds to one word and each dimension has a value corresponding to how many times that word appears in the description. In step 2, the approach builds an encoder that converts these sparse, large vectors into lower dimensional embeddings. In step 3, the approach builds a decoder that expands these embeddings back to their original size. In step 4, the approach trains the encoder and decoder according to a cost function based on how well the output matches the input (e.g., as reflected by a sum of word matching errors on the input and the output).

Figure 2B:
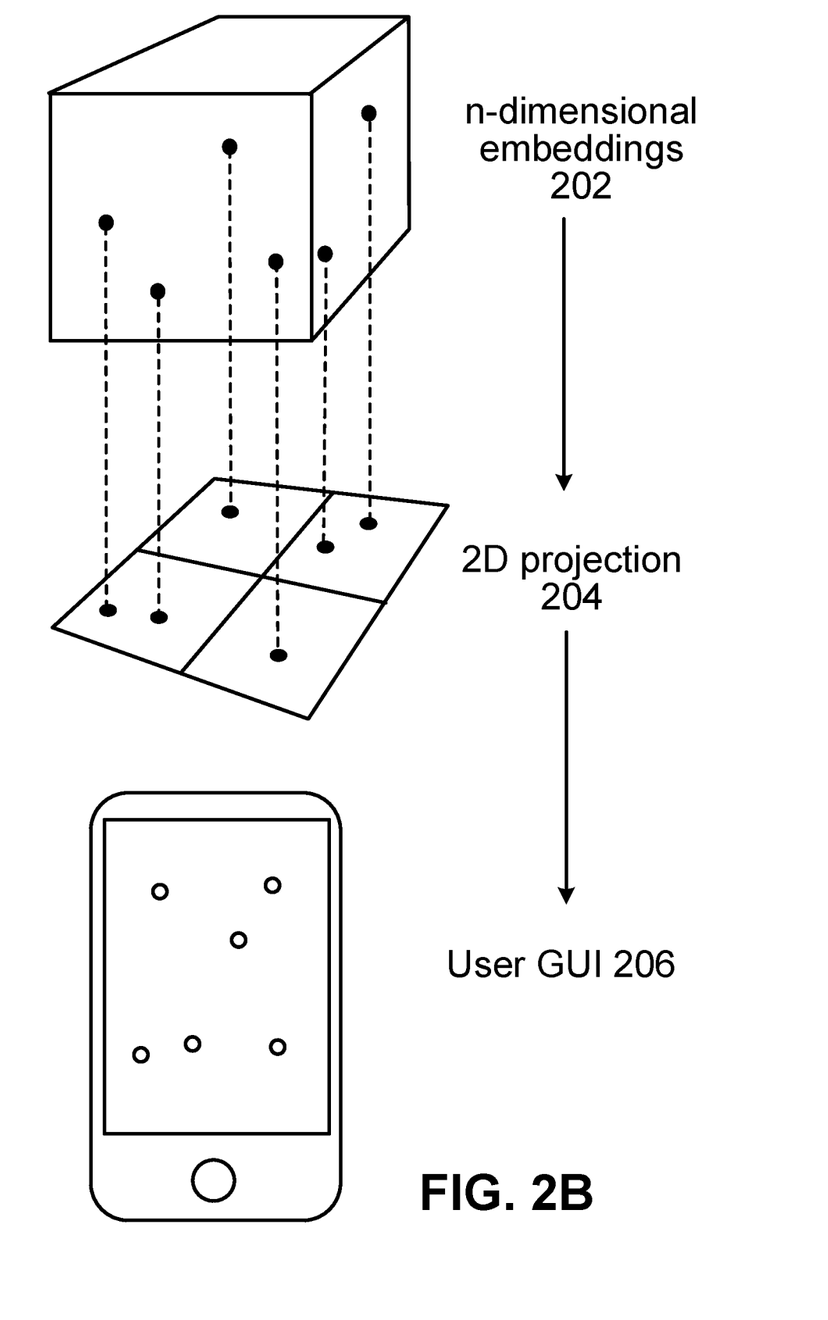
FIG. 2B is an illustration of one example of projecting n-dimensional embeddings onto a 2D coordinate system and then forwarding a representation of that 2D projection to a graphical user interface on a user's computing device.

FIG. 2B is an illustration of one example of projecting n-dimensional embeddings onto a 2D coordinate system and then forwarding a representation of that 2D projection to a graphical user interface on a user's computing device. More specifically, with reference to FIG. 1 and FIG. 2B, machine learning engine 122 forwards n-dimensional embeddings 202 to projection engine 124. The projection engine 124 projects the n-dimensional embeddings 202 to a 2D projection 204. The projection engine 124 can forward the 2D projection 204 to the user interface engine 126 that forwards 2D projection data to user's computer for display on a user GUI 206.

Figure 2C:
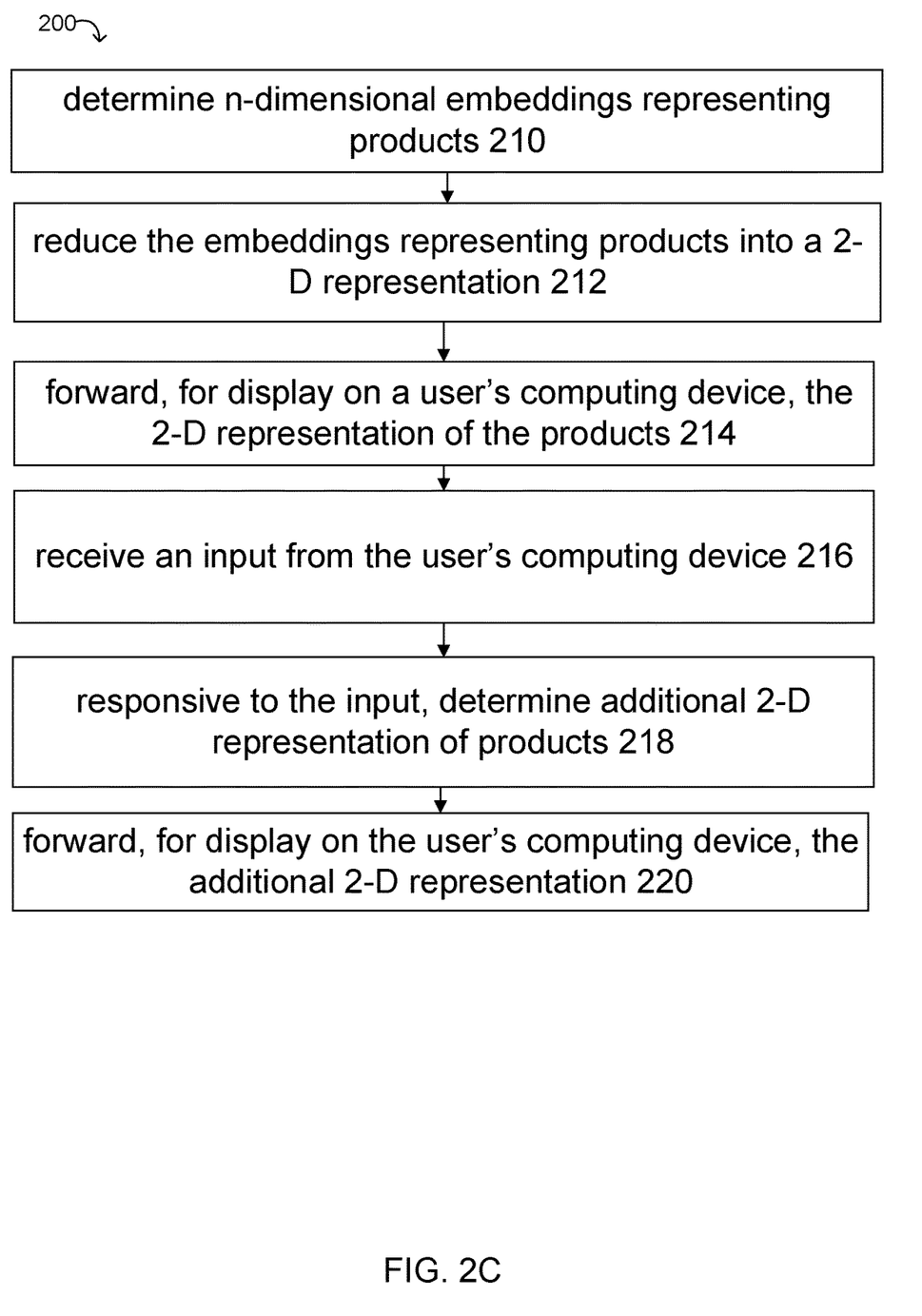
FIG. 2C is an example of a flow-chart of a method for providing intuitive navigation.

FIG. 2C is a flowchart of an example process 200 for providing intuitive navigation. For convenience, the process 200 will be described as being performed by a system of one or more computers, located in one or more locations, and programmed appropriately in accordance with this specification. For example, an intuitive navigation system, e.g., the intuitive navigation system 100 of FIG. 1, appropriately programmed, can perform the process 200.

The process 200 includes: determining 210 n-dimensional embeddings representing entities, e.g., product listings; reducing 212 the embeddings representing the entities into a 2-dimensional representation; forwarding 214, for display on a user's computing device, the 2-dimensional representation of the entities; receiving 216 an input from the user's computing device; responsive to the input, determining 218 an additional 2-dimensional representation of the entities; and forwarding 220, for display on the user's computing device, the additional 2-dimensional representation.

Figure 3:
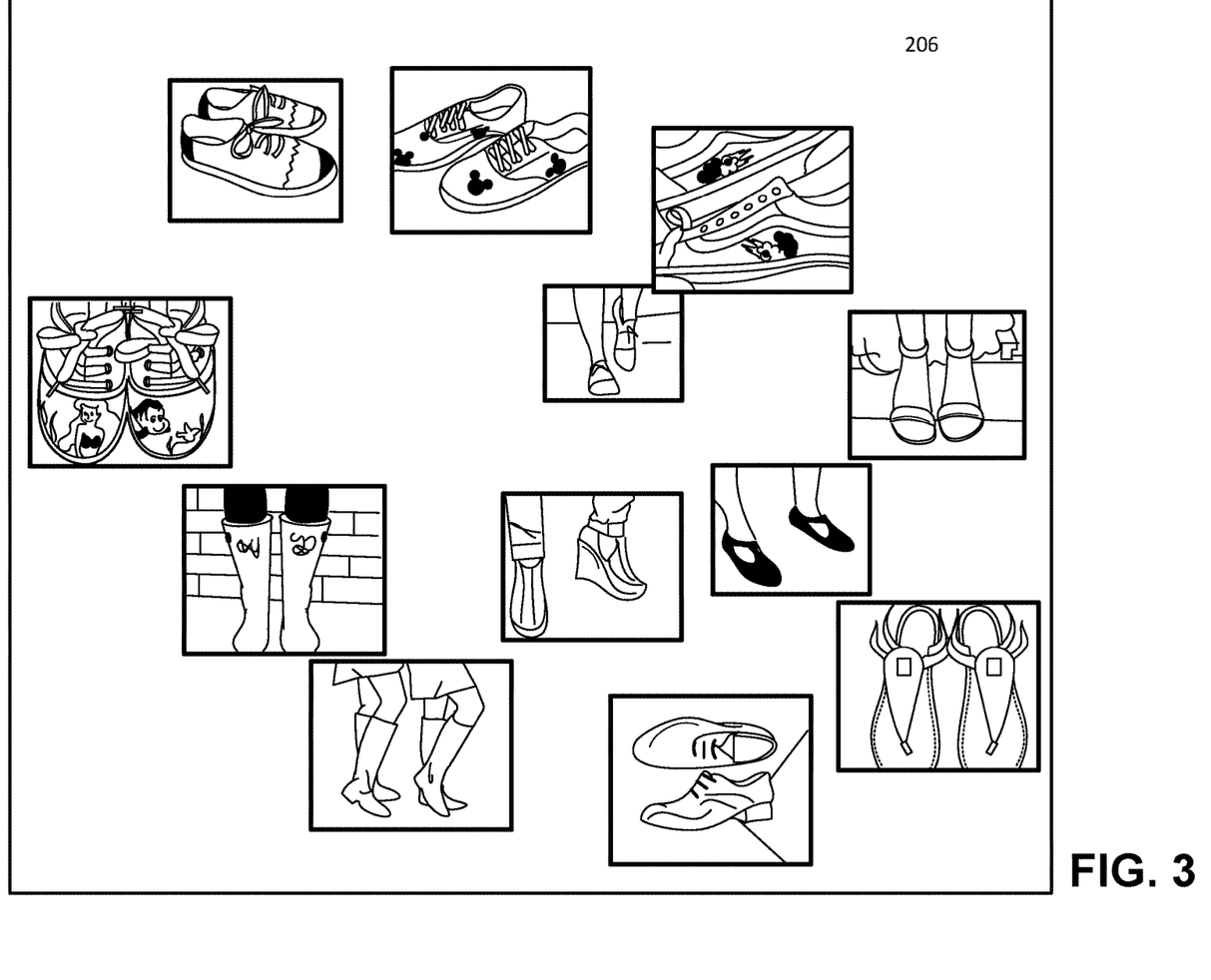
FIGS. 3-8 are screenshots of one example of a user interface displaying products provided by the system of FIG. 1.

FIGS. 3-8 are screenshots of one example of a user interface displaying products provided by the system of FIG. 1. With reference to FIG. 3, a variety of items are shown on the display 206 of a user's computing device. Items are grouped (e.g., placed within a specified distance of each other) intuitively. Dressy items (e.g., items that would be labelled as dressy by surveyed users) are grouped (placed in closer average proximity than non-dressy items). Sandals and boots are separated out. The items might be further organized by having items of a specific color, e.g., white, grouped.

Figure 4:
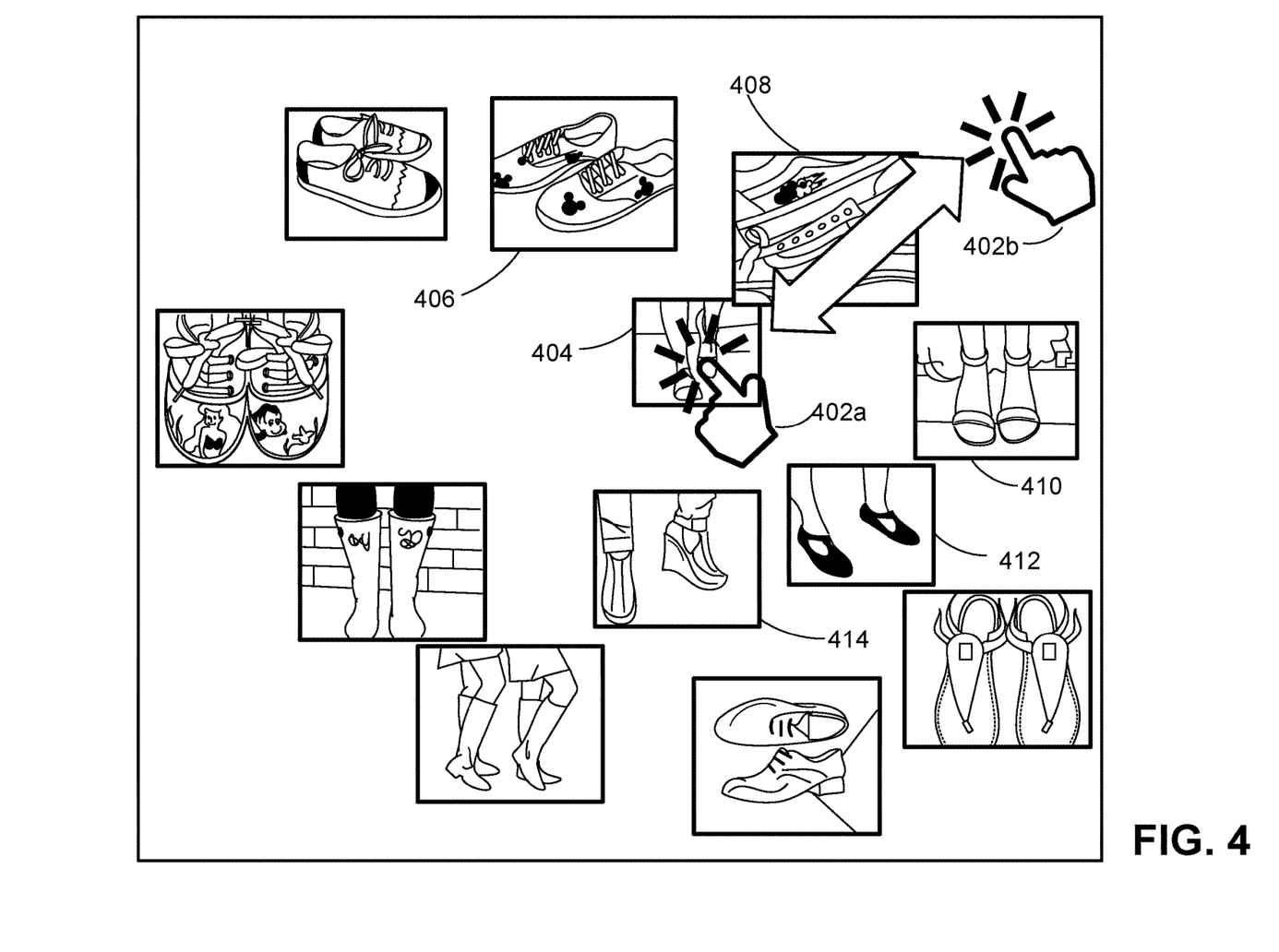

FIG. 4 illustrates a user providing input to the system indicating a desire to see more items similar to items displayed. In one example, the user touches a touch-screen at an area of interest using two fingers (one of the fingers can be a thumb) and while maintaining pressurized contact with the touch screen spreads the two fingers apart until the first and second fingers reach two points on the screen, e.g., points 402a and 402b, respectively. The degree of the spreading of the fingers indicating the degree by which the user would like to zoom in on the selected portion of the display.

Figure 5:
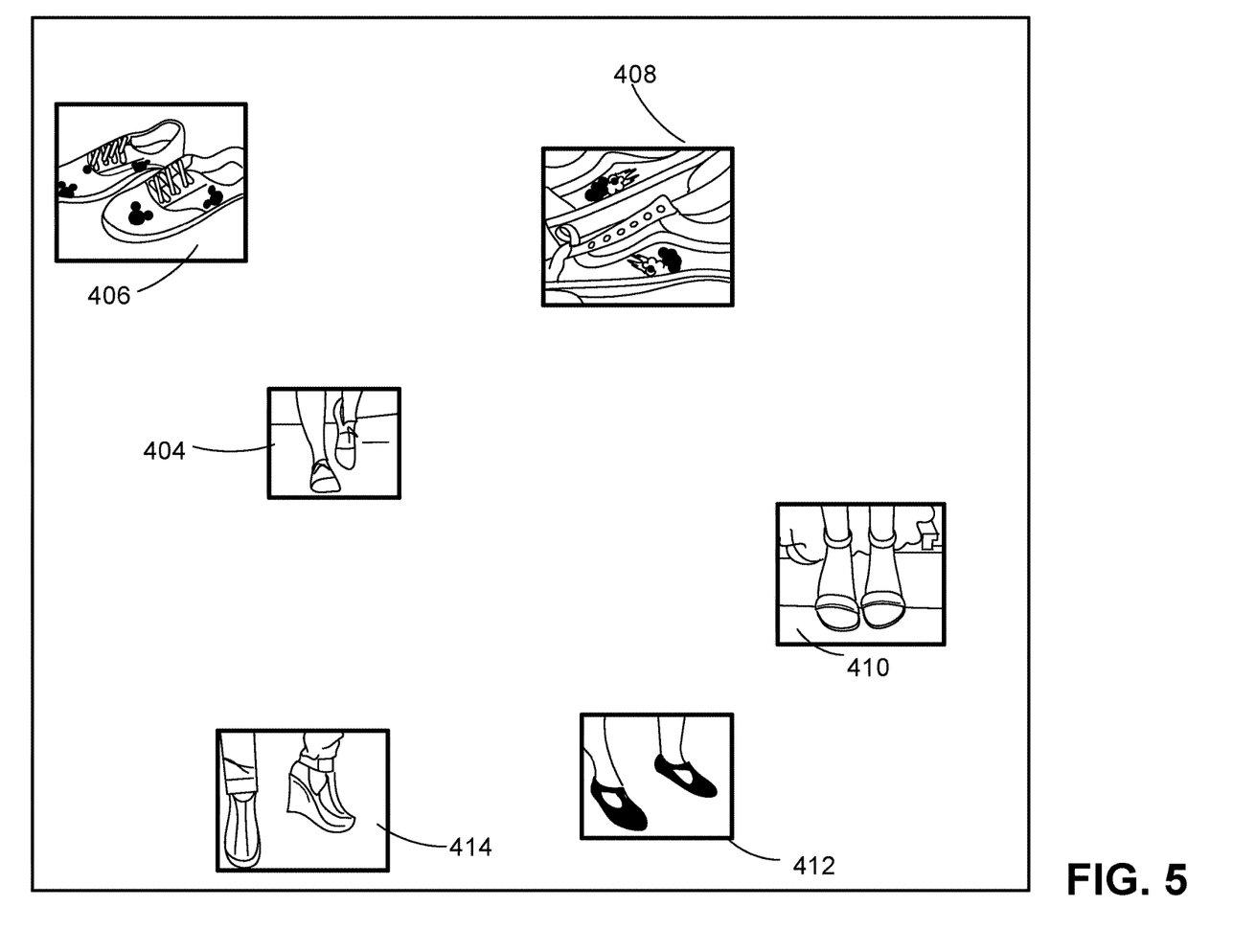

FIG. 5 illustrates that after the user provides input to the system indicating a desire to see more items similar to items displayed at the point of contact of the two fingers, e.g., items similar to items 404, 406, 408, 410 and/or 412, new display data from the intuitive navigation system is displayed. For example, items 404, 406, 408, 410, and/or 412 can be displayed again but spaced further apart and without at least some of the previously displayed items.

Figure 6:
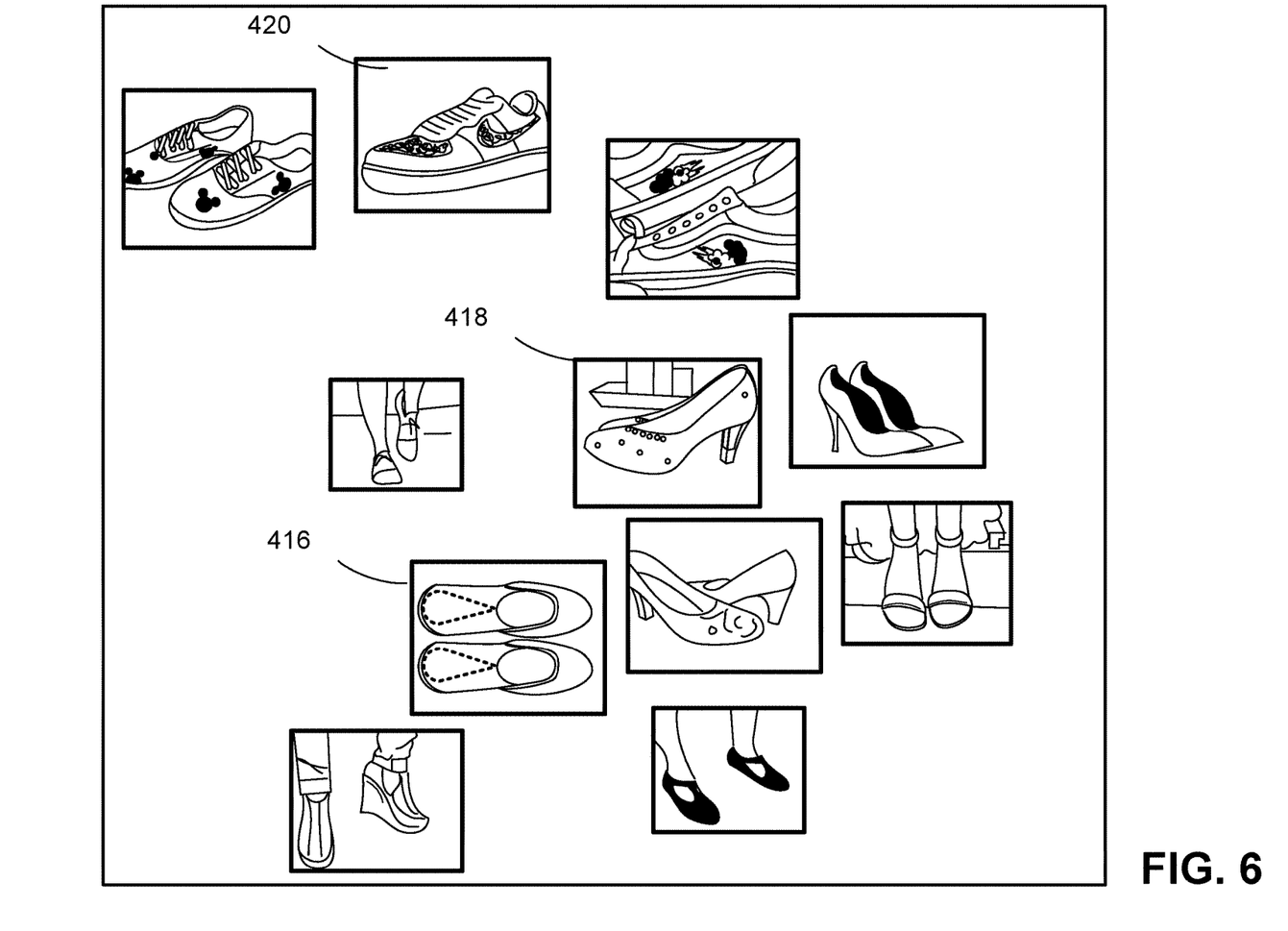

As shown in FIG. 6, new items (e.g., 416, 418, 420) appear in the space between the items shown in the previous/first display (FIG. 4) where the new items are intuitively more similar (e.g., the items will have more attributes in common) to the items persisting between the first display (FIG. 4) and the second/subsequent display (FIG. 6) than to the items no longer persisting.

Figure 7:
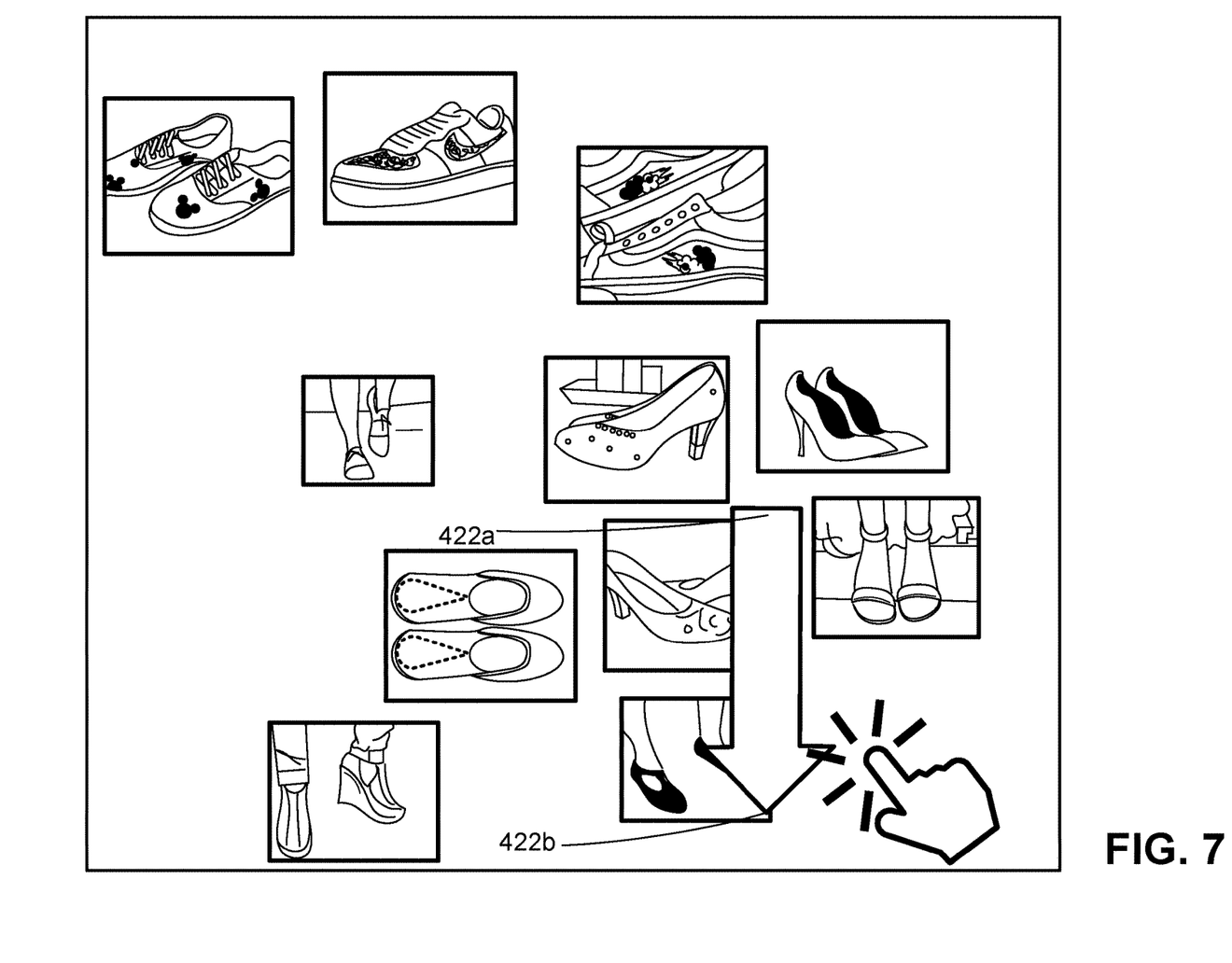

FIG. 7 illustrates an example of another way for a user to indicate that he or she desires to see items having attributes similar to items at one edge of the display. In the illustrated example, a user places one finger in contact with a touch-screen of the user's computing device at point 422a and slides the finger while maintaining pressurized contact with the touch screen to point 422b closer to an edge of the display.

Figure 8:
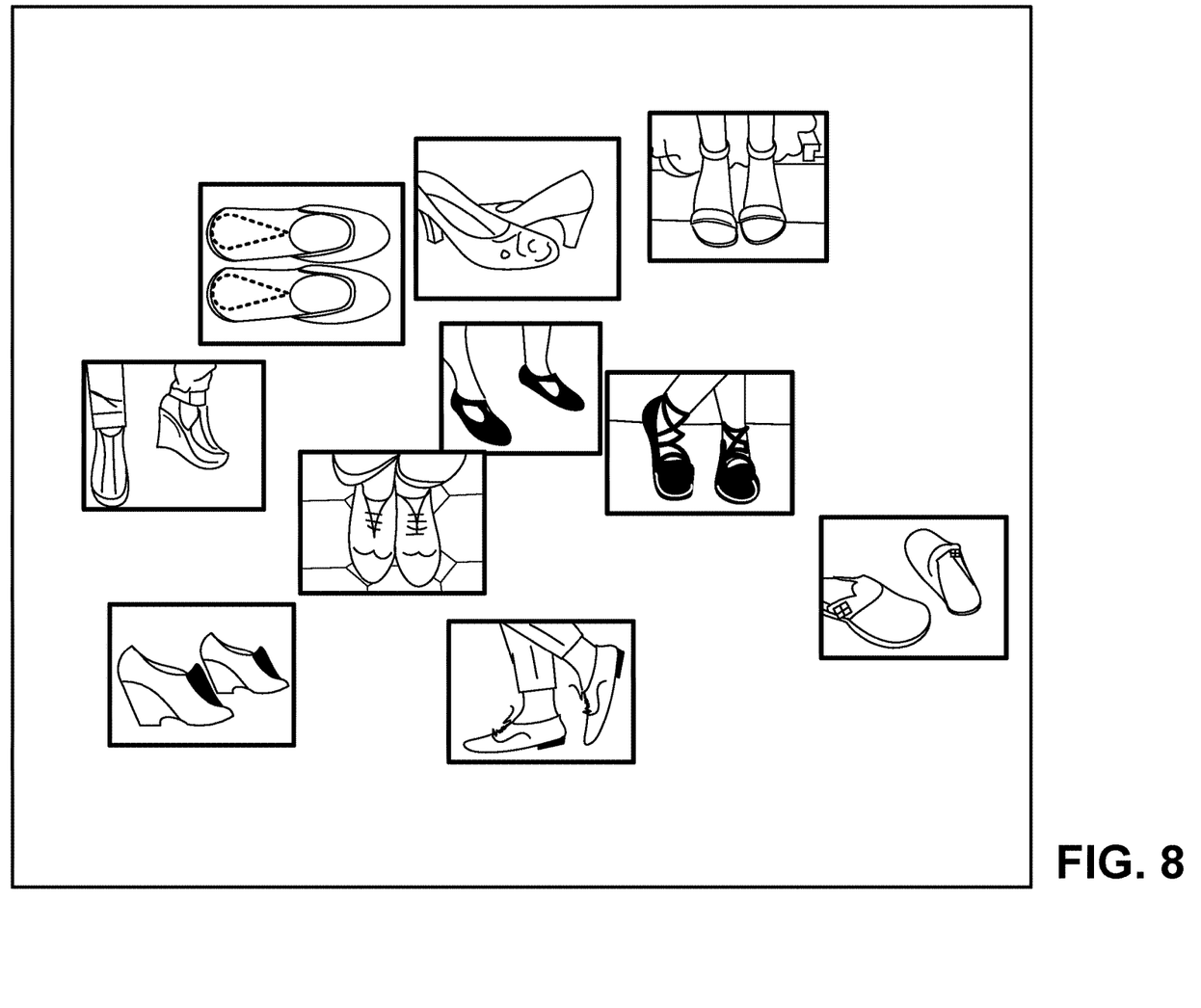

FIG. 8 illustrates the resulting subsequent (3rd display) in the sequence where more items from the domain are displayed as a result of such a panning or scrolling user input. Again some items persist from the prior display (FIG. 6) and new items are displayed that share attributes with the items persisting from the prior display (items persisting from the display shown in FIG. 6).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving a search query from a user computing device of a user;
converting the search query into a vector representation of the search query;
identifying a plurality of n-dimensional entity embeddings in a latent space that are each within a proximity of the vector representation of the search query, wherein each n-dimensional entity embedding represents semantic features of a respective entity and has been generated by operations comprising:
processing a vector descriptor of the entity using an encoder neural network to generate the n-dimensional entity embedding,
wherein the encoder neural network has been trained to optimize a cost function using a machine learning training technique;
projecting, using a projection engine, the respective n-dimensional entity embedding representing each entity into a respective coordinate;
presenting, on a display of the user computing device, a view of an interactive spatial map of the plurality of entities, wherein each entity is shown at a respective location in the interactive spatial map that is defined by the respective coordinate obtained by projecting the n-dimensional entity embedding of the entity;
receiving an input from the user computing device that defines an interaction of the user with the interactive spatial map of the plurality of entities;
responsive to the user interaction, updating the view of the interactive spatial map of the plurality of entities; and
presenting, on the display of the user computing device, the updated view of the interactive spatial map of the plurality of entities.

2. The method of claim 1, wherein the interactive spatial map is a two-dimensional (2-D) spatial map.

3. The method of claim 1, wherein the interactive spatial map is a three-dimensional (3-D) spatial map.

4. The method of claim 1, the display of the user computing device comprises a virtual reality (VR) display.

5. The method of claim 1, wherein the encoder neural network has been jointly trained along with a decoder neural network, comprising training the encoder neural network to, for each of a plurality of training entities, process a vector descriptor of the training entity to generate an n-dimensional embedding of the training entity that, when processed by the decoder neural network, causes the decoder neural network to generate a reconstruction of the vector descriptor of the training entity.

6. The method of claim 1, wherein identifying the plurality of n-dimensional entity embeddings in the latent space comprises, for each of the n-dimensional entity embeddings, determining a respective proximity between the n-dimensional entity embedding and the vector representation of the search query.

7. The method of claim 6, wherein for each of the n-dimensional entity embeddings, the proximity between the n-dimensional entity embedding and the vector representation of the search query is based at least in part on a distance metric.

8. The method of claim 7, wherein the distance metric comprises at least one of cosine similarity, Euclidean distance, Poincaré distance and geodesic distance for a discrete graph.

9. The method of claim 1, wherein each entity is a respective product, the interaction of the user with the spatial map of the plurality of entities indicates a request by the user to see more products that have attributes of at least one displayed product.

10. The method of claim 1, wherein each entity represents a respective product, and wherein the interaction of the user with the spatial map of the plurality of entities indicates a request by the user to see products different from those that are currently being displayed.

11. The method of claim 1 wherein each entity represents at least one of: a product listing, a shop page, an item category, and a collection of items selected by one or more users.

12. The method of claim 1 wherein presenting, on the display of the user computing device, the view of the spatial map comprises forwarding data defining the view of the spatial map to the user computing device.

13. The method of claim 1, wherein the interaction of the user with the interactive spatial map of the plurality of entities specifies a request to update the view of the interactive spatial map of the plurality of entities.

14. The method of claim 1, wherein the interaction of the user with the interactive spatial map of the plurality of entities specifies a selection of a set of one or more coordinates of the spatial map of the plurality of entities; and
wherein updating the view of the interactive spatial map comprises:
updating the view of the spatial map based at least in part on the selected set of spatial coordinates of the spatial map of the plurality of entities.

15. A system comprising:
one or more computers; and
one or more storage devices communicatively coupled to the one or more computers, wherein the one or more storage devices store instructions that, when executed by the one or more computers, cause the one or more computers to perform operations comprising:
receiving a search query from a user computing device of a user;
converting the search query into a vector representation of the search query;
identifying a plurality of n-dimensional entity embeddings in a latent space that are each within a proximity of the vector representation of the search query, wherein each n-dimensional entity embedding represents semantic features of a respective entity and has been generated by operations comprising:
processing a vector descriptor of the entity using an encoder neural network to generate the n-dimensional entity embedding, wherein the encoder neural network has been trained to optimize a cost function using a machine learning training technique;

projecting, using a projection engine, the respective n-dimensional entity embedding representing each entity into a respective coordinate;

presenting, on a display of the user computing device, a view of an interactive spatial map of the plurality of entities, wherein each entity is shown at a respective location in the interactive spatial map that is defined by the respective coordinate obtained by projecting the n-dimensional entity embedding of the entity;

receiving an input from the user computing device that defines an interaction of the user with the interactive spatial map of the plurality of entities;

responsive to the user interaction, updating the view of the interactive spatial map of the plurality of entities; and presenting, on the display of the user computing device, the updated view of the interactive spatial map of the plurality of entities.

16. One or more non-transitory computer storage media storing instructions that when executed by one or more computers cause the one or more computers to perform operations comprising:

receiving a search query from a user computing device of a user;

converting the search query into a vector representation of the search query;

identifying a plurality of n-dimensional entity embeddings in a latent space that are each within a proximity of the vector representation of the search query, wherein each n-dimensional entity embedding represents semantic features of a respective entity and has been generated by operations comprising:

processing a vector descriptor of the entity using an encoder neural network to generate the n-dimensional entity embedding, wherein the encoder neural network has been trained to optimize a cost function using a machine learning training technique;

projecting, using a projection engine, the respective n-dimensional entity embedding representing each entity into a respective coordinate;

presenting, on a display of the user computing device, a view of an interactive spatial map of the plurality of entities, wherein each entity is shown at a respective location in the interactive spatial map that is defined by the respective coordinate obtained by projecting the n-dimensional entity embedding of the entity;

receiving an input from the user computing device that defines an interaction of the user with the interactive spatial map of the plurality of entities;

responsive to the user interaction, updating the view of the interactive spatial map of the plurality of entities; and presenting, on the display of the user computing device, the updated view of the interactive spatial map of the plurality of entities.

17. The non-transitory computer storage media of claim 16, wherein the interactive spatial map is a two-dimensional (2-D) spatial map.

18. The non-transitory computer storage media of claim 16, wherein the interactive spatial map is a three-dimensional (3-D) spatial map.

19. The non-transitory computer storage media of claim 16, the display of the user computing device comprises a virtual reality (VR) display.

20. The non-transitory computer storage media of claim 16, wherein the encoder neural network has been jointly trained along with a decoder neural network, comprising training the encoder neural network to, for each of a plurality of training entities, process a vector descriptor of the training entity to generate an n-dimensional embedding of the training entity that, when processed by the decoder neural network, causes the decoder neural network to generate a reconstruction of the vector descriptor of the training entity.

* * * * *